Figure 1:
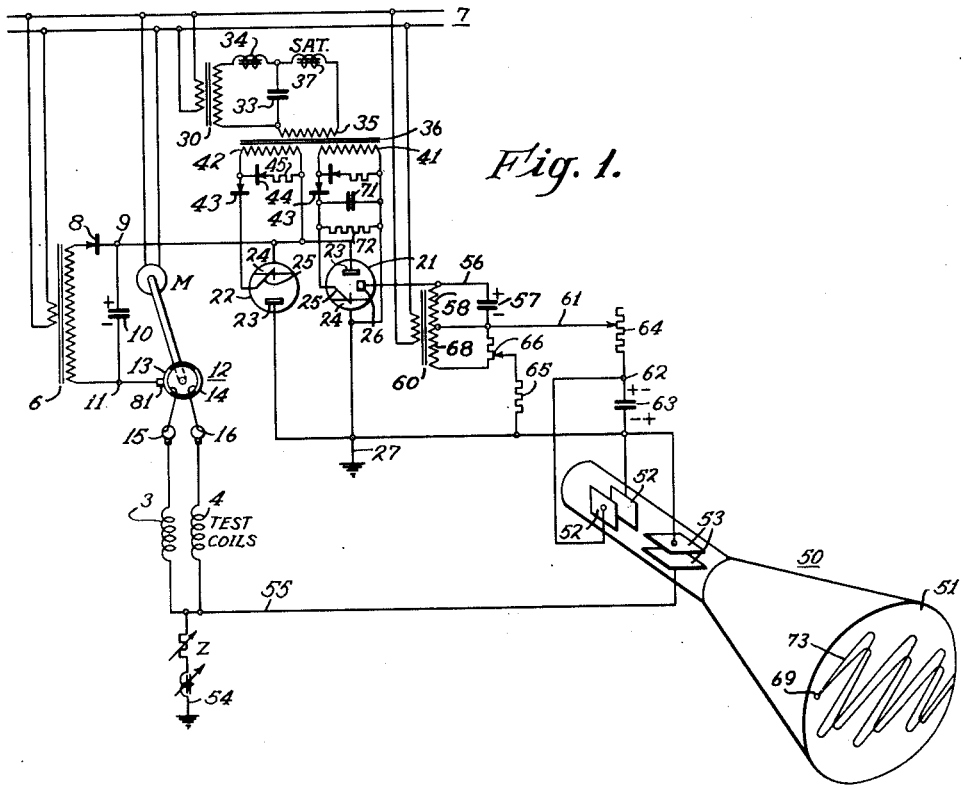

Oct. 2, 1951     E. F. HARTER     2,569,990

SURGE TESTING

Filed Nov. 7, 1946

WITNESSES:
Edward Michaels
Nw. C. Groove

INVENTOR
Earl F. Harter.
BY O.B.Buchanan
ATTORNEY

Patented Oct. 2, 1951

2,569,990

UNITED STATES PATENT OFFICE 2,569,990

SURGE TESTING

Earl F. Harter, Pittsburgh, Pa., assignor to Westinghouse Electric Corporation, East Pittsburgh, Pa., a corporation of Pennsylvania Application November 7, 1946, Serial No. 708,398

14 Claims. (Cl. 175—183)

My invention relates to electrical testing-apparatus which is particularly adapted for the comparative testing of a pair of similar electrical elements of a device to be tested, utilizing the principle of repetitive unidirectional surges which are applied alternately to the elements in question. The invention is an improvement over the apparatus, circuits and methods which are described in an AIEE paper by G. L. Moses and myself, entitled "Winding-Fault Detection and Location by Surge-Comparison Testing," and published in Electrical Engineering, July 1945, Transactions, pages 499–503.

An object of my invention is to provide a practical means for utilizing an ignitron, as the surge-applying valve, rather than employing hot-cathode gas-filled tubes. The duration of the testing-impulse is very short, so that an ignitron, for triggering this impulse, is practically indestructible from the standpoint of the magnitude of the discharge-current, and it is also capable of withstanding an extremely high momentary peak-voltage, both of which qualities are absent in the gas-tube valve. The ignitron has a drawback, however, which at first seemed insurmountable, because of the appreciable time which is taken by the ignitor-circuit to fire an ignitron. If this firing-time were constant, it would not matter, but it varies considerably, even in successive cycles of a 60-cycle supply; and the time-variation is commensurate with the duration of the discharging-time of the test-surge. The surge-comparison testing-method, to which my invention applies, consists in comparing successive standing waves on the fluorescent screen of an oscilloscope, which requires a fairly accurate synchronization of the commencement of the beam-sweeping timing-voltage-variation of the oscilloscope with the commencement of the surge-discharge (or the firing of the ignitron-tube which acts as a triggering-valve).

An object of my invention is to overcome this handicap by utilizing an auxiliary electrode, in the ignitron-tube, for controlling the oscilloscope or other testing-instrument.

A further object of my invention is to utilize two ignitron-tubes, or other controlled tubes, connected back-to-back, the forwardly conducting tube serving as a trigger-valve to initiate the discharge of the repetitive unidirectional surge-voltage, while the inversion-connected tube is being utilized to conduct subsequent negative half-waves of an oscillatory surge-discharge, thus producing a continued and mildly damped oscillation. When applied to ignitrons, with their randomly varying firing-times, means must be included for insuring that the inversion-connected tube is fired, or in readiness for conduction, prior to the firing of the surge triggering tube.

A further object of my invention is to provide a commutator-means for applying the testing surge alternately and exclusively to first one and then the other of two similar electrical elements of the device to be comparatively tested. By this means, I avoid a difficulty which has been experienced in previous devices utilizing serially connected test-coils, which causes excessive test-voltages to be applied to one of these coils, in case the other coil is already short-circuited, or becomes short-circuited during the application of the test-surge.

A still further object of my invention is to provide a comparative surge-test circuit utilizing a small controllable impedance which is serially included at the grounded end of the branched test-circuits of the two test-coils which are to be compared with each other, and connecting the voltage-responsive terminals of the oscilloscope across this series impedance. The voltage across this series impedance is only a very small fraction of the test-voltage, so that the inclusion of this impedance in the grounded connection does not materially increase the line-to-ground voltage of the test-coils. It also provides a very acceptable source of voltage of the correct low magnitude for correct application to the voltage-responsive electrodes of the oscilloscope. If such a low oscilloscope-voltage were not available, as in some previous comparative-surge testing-systems, it would be necessary, in any practical circuit, to utilize a capacitor-potentiometer or voltage-divider, which would involve miniature parasitic oscillatory circuits, due to stray couplings, which would result in "hash" on the oscilloscope-screen. The serially connected ground-circuit impedance can be adjusted in magnitude, to adjust the size of the standing wave on the screen, and it can be adjusted in phase, in such manner as to provide a phase-displacement of the two standing waves of the two test-coils, for different kinds of faults on one of the test-coils, and this phase-displacement may be optimumly adjusted for greatest fault-detection sensitivity.

Figure 2:
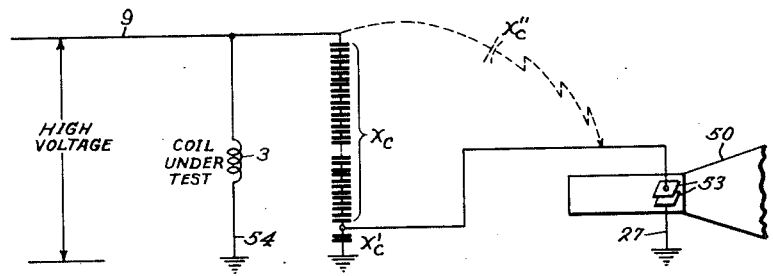

With the foregoing and other objects in view, my invention consists in the systems, circuits, combinations, operations, apparatus, and parts hereinafter described and claimed and illustrated in the accompanying drawing, wherein:

Figure 1 is a simplified diagrammatic view of circuits and apparatus illustrating the essential features of an exemplary form of embodiment of my invention; and Fig. 2 is a circuit diagram which will be referred to in the explanation.

My invention, in one form of embodiment, is particularly applicable to the application of the comparison-method to the testing of two coils which are to be similar, as shown at 3 and 4 in Fig. 1. The illustrated apparatus, in Fig. 1, utilizes a source for supplying a repetitive unidirectional surge-voltage, this source being illustrated as comprising a stepup transformer 6 which is energized from a 60-cycle circuit 7. One high-voltage terminal of the transformer 6 is connected, through a rectifying-means 8 to the positively charged terminal 9 of a capacitor 10, which serves as a source of surge-voltage energy for testing purposes. The negatively charged terminal 11 of the surge-power capacitor 10 is connected to the other high-voltage terminal of the stepup transformer 6.

The negative terminal 11 of the surge-delivering capacitor 10 is connected alternately to first one and then the other of the two test-coils 3 and 4 through a rotating commutator 12 having two conducting segments 13 and 14, which are connected to the terminals of the respective coils 3 and 4 through slip-rings 15 and 16 respectively. The commutator 12 is driven by means of a synchronous motor M which is energized from the 60-cycle line 7.

The positively charged terminal 9 of the surge-delivering capacitor 10 is connected to ground through two rectifier-tubes which are preferably ignitron-tubes 21 and 22, as shown, each tube having a main anode 23, a mercury cathode 24, and an ignitor 25. The tube 21 is also provided with an auxiliary anode 26. The two ignitron-tubes 21 and 22 are connected with their main anode-cathode circuits connected in back-to-back relation between the positive capacitor-terminal 9 and ground, as indicated at 27. That is, the tube 21 is connected in rectifier fashion, with its anode 23 connected to the positive terminal 9, and its cathode 24 connected to the grounded terminal 27, while the tube 22 is connected in an inverter fashion, with its cathode 24 connected to the positive terminal 9, and its anode 23 connected to the grounded terminal 27.

The two ignitron-tubes 21 and 22 are normally in a non-conducting state, and they are provided with suitable exciting-circuits for exciting their respective ignitors 25 so as to fire the tubes, or change them into their conducting state, or in readiness for conduction, at a predetermined point in each cycle of the 60-cycle supply-line 7.

The exciting-circuit means is illustrated as comprising an energy-supplying transformer 30, which is energized from the 60-cycle supply-line 7, and which energizes a firing-capacitor 33 through a linear inductor 34. The terminals of the firing capacitor 33 are connected to the primary winding 35 of an insulating-transformer 36, through a saturating inductor 37, which saturates at a predetermined point in each half-cycle, and thus suddenly becomes a relatively low impedance which discharges the capacitor 33 through the primary winding 35. The insulating transformer 36 is shown as having two identical secondary windings 41 and 42, which energize the respective ignitors 25 through serially connected rectifiers 43 which supply only the positive half-waves to the respective ignitors. A return-path for the flux decay current of the insulating transformer 36 is provided by means of a circuit which is connected in shunt across each of the transformer-secondaries 41 and 42, and comprising a rectifier 44 and a resistance 45.

My testing apparatus as shown in Fig. 1 comprises a suitable testing-instrument which may, in general, be a wave-responsive apparatus which is responsive to any electrical function of the voltage-wave to be measured, such as a frequency-response, or a voltage-response, or a wave-form response. In the preferred form of apparatus, as illustrated in Fig. 1, the testing-instrument is a cathode-ray oscilloscope 50, which gives a visual indication or trace of a moving electron-beam on the fluorescent oscilloscope-screen 51.

The oscilloscope 50 has two pairs of deflection-electrodes or plates, through or between which the electron-beam passes, these plates being excited with suitable voltages, so that the beam will be attracted or bent toward the more positive plate of each pair. There are two horizontally separated vertical plates 52, which are supplied with a voltage which increases linearly with time, to sweep the beam across the screen 51 in a horizontal direction, thus determining the sweep-speed. There are also two vertically separated horizontal electrodes 53, which are impressed with the voltage to be investigated. The fluorescent quality of the oscilloscope-screen 51 provides a sufficient persistence-of-vision effect to make the trace of the rapidly moving electron-beam remain visible for a certain small time after the beam has passed, so that a plurality of successive waves will be visible upon the screen at the same time.

In a preferred form of embodiment of my invention, as shown in Fig. 1, the voltage to be investigated is impressed upon the vertical-deflection electrodes 53 of the oscilloscope, from the surge-discharge circuits of the two test-coils 3 and 4, in the following manner. The high-voltage terminals of the test-coils 3 and 4 are connected to the negative terminal 11 of the surge-delivering capacitor 10, through the rotating commutator 12, as previously explained. The low-voltage terminals of the test-coils 3 and 4 are connected together, in a common grounded circuit 54, which contains a small serially connected impedance Z, which can be adjusted, both in magnitude and in its phase-angle. Thus, the lower vertical-deflection electrode 53 is connected to the junction-point 55 between the impedance Z and the low-voltage terminals of the two test-coils 3 and 4, while the upper vertical-deflection electrode 53 is connected to the grounded circuit 27, and thence to the grounded circuit 54 which constitutes the other terminal of the impedance Z.

The horizontal-deflection electrodes 52 of the oscilloscope are excited by any suitable means which supplies a steadily increasing unidirectional voltage which starts to increase at substantially the same moment when the ignitron 21, or other repetitive circuit-making device, becomes conducting so as to discharge the surge-delivering capacitor 10 through the testing-circuit, which will include either the one or the other of the two test-coils 3 or 4, according to the instantaneous position of the synchronously rotating commutator 12. In accordance with my present invention, I make use of the auxiliary anode 26, in the main rectifying-connected ignitron 21, for initiating the voltage-sweeping wave for supplying the time-component of the standing wave which is to appear on the oscilloscope-screen 51. In this manner, I avoid the use of a separate tube for such a purpose, and I secure a response which is inherently substantially synchronous with the firing of the rectifying-connected tube 21.

As shown in Fig. 1, the auxiliary anode 26 is utilized to respond, at the instant of firing of the tube 21, so as to make a low impedance connection between the tube-cathode 24 and the auxiliary anode 26, and the auxiliary anode 26 is connected to the upper or positively-charged terminal 56 of a capacitor 57. The capacitor 57 is energized from the top portion 58 of the secondary winding of a transformer 60, the primary of which is energized from the 60-cycle circuit 7, in such polarity that the top terminal 56 of the secondary winding is positive at the moment when the ignitron 21 is fired, during each cycle of the 60-cycle circuit. The negative terminal 61 of the capacitor 57 is connected to the upper terminal 62 of another capacitor 63 through a variable resistance 64. The lower terminal of the last-mentioned capacitor 63 is connected to the grounded circuit 27, which is also connected, through a current-limiting resistor 65, to an adjustable potentiometer-tap 66 of a resistance which is connected across the lower half 68 of the secondary winding of the transformer 60.

As a result of the potentiometer-connection 66 just described, the capacitor 63 is initially charged by the transformer 60 so that it has a positive charge on its upper terminal 62 at the instant just before the firing of the ignitron 21. The positive potential of the terminal 62 is applied to the left-hand horizontal-deflection plate 52, so that the electron-beam is initially drawn over near the left side of the screen 51, as indicated by the point 69, the right-hand horizontal-deflection plate 52 being grounded by being connected to the grounded circuit 27.

In operation, at a moment when the 60-cycle supply-line 7 supplies a positive half-wave to the positive terminal 9 of the surge-delivering capacitor 10, the 60-cycle supply-line also delivers a positive impulse to both of the ignitors 25 of the ignitron-tubes 21 and 22, and at the same time the 60-cycle circuit 7 has positively charged the upper terminals 56 and 62 of the two capacitors 57 and 63, the charge on the capacitor 57 being higher than that on the capacitor 63 because the capacitor 63 is charged to a reduced value which is determined by the setting of the potentiometer 66.

The application of a positive exciting-impulse to each of the ignitors 25 fires both of the ignitron-tubes 21 and 22, but this firing is not instantaneous, but requires a certain measurable time which, unfortunately, is subject to random fluctuations over a rather wide range. It is quite desirable, as will subsequently appear, for the conducting state of the inverter-connected tube 22 to be established before the conducting state of the rectifier-connected tube is established. In other words, it is quite desirable for the tube 22 to be fired before the tube 21. One means for bringing about this first-firing of the tube 22, is to delay the firing of the tube 21, which may be accomplished by means of a shunt-connected capacitor 71, which is connected in shunt across the ignitor 25 of the tube 21. The effect of the shunting capacitor 71 is to absorb the initial part of the energy of the firing-circuit in which it is connected, thus causing the tube 21 to delay its firing, until the tube 22 has had ample opportunity to fire. The shunting capacitor 71 may be itself shunted by means of a discharge-resistor 72 for discharging the capacitor during the negative half-cycles of the 60-cycle supply. The discharge-resistor 72 also has a delaying effect upon the firing of the ignitron-tube 21.

When the inverter-connected tube 22 first fires, nothing happens, because the tube is connected so as to be conducting only for currents flowing from the grounded circuit 27 toward the positive terminal 9 of the surge-delivering capacitor 10. A short while after the firing of the inverter-connected or negatively connected tube 22, the rectifyingly connected positively connected tube 21 fires, thus grounding the positive terminal 9 of the surge-delivering capacitor 10, and completing a discharge-circuit through one of the test-coils 3 or 4, and the grounded terminal 54 of the serially connected grounding-impedance Z. The initial portion of the discharge-wave is reflected, on the oscilloscope-screen 51, as an upwardly swinging light-beam 73.

At the same moment when the test-surge discharge is initiated, by the firing of the positively connected tube 21, the auxiliary anode 26 of the same tube becomes conductively connected to the cathode 24, with only a small arc-voltage drop, in the tube, so that the positively charged upper terminal 56 of the capacitor 57 is connected to the negatively charged lower terminal of the capacitor 63, through the mercury cathode 24 and the grounded circuit 27. The strongly positively charged capacitor 57 thereupon begins to discharge through the less strongly negatively charged capacitor 63, at a rate which is determined by the setting of the adjustable resistance 64. The initially negatively charged capacitor 63 thereupon begins to diminish its charge, and finally its charge may be reversed, as indicated by the second set of plus and minus signs which are applied thereto. Since the voltage of the initially negatively charged capacitor 63 is applied to the horizontal-deflection plates 52 of the oscilloscope, the light-beam trace 73 on the screen 51 is given a horizontal motion across the screen, as it traces the varying voltage which appears across the terminals of the serially connected grounding-impedance Z of the test-coil surge-discharge circuit.

While the surge-delivering capacitor 10 is energized by only the positive half-waves of the high test-voltage which is supplied by the transformer 6, as determined by the rectifier 8, the actual surges which are delivered are oscillatory, both positive and negative. The surge-discharge current always starts out in a positive direction, as shown at 73 on the screen 51, but the surge-current quickly reverses, and goes through a number of positive and negative half-cycles, at a high oscillation-frequency which is determined by the relative magnitudes of the inductive and capacitive reactances of the discharge-circuit, including the capacitive couplings between the test-coils 3 and 4 and other portions of the electrical device which is being tested. These capacitive couplings would provide a circuit-path for the negative half-waves, even in the absence of the negatively connected rectifier-tube 22; but, in many cases, it is desirable to provide the negatively connected tube 22, in order to provide a better circuit-path for the negative half-waves of the oscillatory discharge. Since the oscillatory discharge-frequency is very high, the first negative wave of the oscillatory discharge occurs almost instantaneously after the initiation of the first positive wave of the discharge, the time-delay being of a much smaller order of magnitude than the time-delays which are incurred in the excitation of the ignitors 25 and the firing of the respective tubes 21 and 22. It is for this reason that it is necessary to make sure that the negatively connected tube 22 is fired before the positively connected tube 21, because the surge-discharge is initiated by the firing of the positively connected tube 21.

It will be understood that the synchronously rotating commutator 12 is rotating at some speed which is synchronous with respect to the 60-cycle supply-line 7, so that first one commutator-segment 13 and then the other segment 14 is brought into contact with the brush 81 which is connected to the initially negative capacitor-terminal 11, at a rate such that each segment 13 or 14 receives one, or two, or any other predetermined number of testing-surges, before it moves out from its contact with the brush 81, after which, there is a period of non-conductivity, which may correspond to one or more surges which are not applied to either one of the test-coils 3 or 4, followed by a corresponding period during which the second commutator-segment, such as 14, is in contact with the brush 81 or terminal 11.

The fluorescent property of the screen 51 keeps the trace which is made by the standing-wave of each surge-discharge present on the screen for a certain fraction of a second, corresponding to a number of cycles of the 60-cycle supply-system 7, so that the traces of a number of successive surges are visible on the screen 51, at the same time.

The test-coils 3 and 4 are normally substantially similar to each other, so that the same size and shape and timing of surge-trace appears on the screen, no matter which coil 3 or 4 is included in the test surge discharge-circuit, by reason of the action of the rotating commutator 12. If, however, there should be a fault in either one of the test-coils 3 or 4, including an open circuit, a ground, or a short-circuit, the faulted coil will have a surge-discharge current which is different from the sound coil, and this difference will show up as a difference in magnitude or in phase, or usually both, in the surge-traces which are visible on the screen 51, producing a double wave effect such as is shown in Fig. 1.

An advantage of the use of an ignitron for the surge-triggering valve 21 is that, for the short-time surges which are utilized, the tube is practically indestructible and a great deal more power can be put into the test-coils 3 and 4 for test-purposes, than has been feasible with any known type of circuit utilizing gas-tubes. The serious disadvantage of the ignitron-tube, in having an unpredictable time-delay in its firing, has been overcome, in my circuit, by utilizing the auxiliary anode 26 in the surge-triggering ignitron-tube 21, thus not only overcoming the sole disadvantage of the ignitron-tube, but also avoiding the necessity for the use of an extra tube for performing the same function which is accomplished by the auxiliary anode 26.

The use of the voltage-drop in the small grounding-impedance Z to energize the voltage-measuring circuit of the oscilloscope makes it possible to dispense with the voltage-divider which has heretofore been necessary, in many circuits, as shown at $X_c$ and $X'_c$ in Fig. 2. To test at 10 kilovolts (peak), using the usual five-inch cathode-ray tube 50, a voltage-divider ratio of about 70:1 is required. This means that $X_c$ must be very high, compared to $X'_c$. The stray capacities $X''_c$, as shown, can be nearly the same as $X_c$, and these stray capacities not only affect the voltage-divider ratio, but they also introduce miniature parasitic oscillatory circuits which make an unintelligible confusion of surge-trace lines on the oscilloscope-screen 51. Any attempt to make the capacities $X_c$ and $X'_c$ low enough so that stray coupling would be negligible would not only involve an uneconomically large amount of capacitance, but also place an excessive load on the surge-delivering capacitor 10 and the surge-delivering transformer 6, with its rectifier 8.

It will be noted also, from Fig. 1, that I have provided a comparative surge-testing circuit in which practically all, say sixty-nine seventieths, of the surge-energy, is applied to first one test-coil 3, and then the other test-coil 4, energizing the coils one at a time, and not in series with each other, as in many previously known test-circuits. This has two important advantages, namely making available the entire surge-voltage and surge-energy for testing each coil, and secondly, avoiding the rather serious feature, encountered when the two test-coils were connected in series, whereby a short-circuit on either test-coil would result in over-stressing the sound test-coil, frequently causing a failure of the sound test-coil.

While I have illustrated my invention in but a single form of embodiment, which is intended to be illustrative of the principles of application of the invention, in a preferred circuit, I wish it to be understood that various circuit-changes and substitutions and omissions and additions may be made without departing from the essential feature of my invention in its broadest aspect. It is desired, therefore, that the appended claims shall be accorded the broadest construction consistent with their language.

I claim as my invention:

1. An electrical testing-apparatus comprising, in combination, a supply-circuit for test-energy, a test-circuit for connecting the apparatus to an electrical device to be tested, a testing-instrument, an ignitron tube comprising a main anode, an auixilary anode, a cathode, and an ignitor, an ignitor-circuit comprising means for impulsing the ignitor to fire the tube, connections for including the main anode-cathode circuit of the tube in an energizing circuit for the test-circuit, for connecting the same to the supply-circuit, and control-circuit-means, including, and responsive to the voltage of, said auxiliary anode, for energizing said testing-instrument substantially simultaneously with the energizing circuit for the test-circuit, for testing said device.

2. The invention as defined in claim 1, characterized by said testing-instrument being an electron-beam oscilloscope having a pair of beam-sweeping timing-electrodes and a pair of beam-deflecting measuring-electrodes, connections for causing the measuring-electrodes to be responsive to the voltage to be tested, and connections for causing a timing voltage-variation of the timing-electrodes to be initiated by the control-circuit-means including said auxiliary anode.

3. An electrical testing-apparatus comprising, in combination: a test-energy-source of repetitive unidirectional surges; separate test-circuits for separately connecting the apparatus to each of a pair of electrical elements to be comparatively tested; a testing-instrument; a commutating device for alternately channeling said test-energy-source, said test-circuits, and said testing-instrument so that a surge or surges are alternately applied to the respective test-circuits in such manner that the testing-instrument alternately responds to a voltage of first one element and then the other element; two controlled tubes, each having a main anode-cathode circuit and a control-electrode, the tubes normally being in a non-conducting state and having their respective anode-cathode circuits connected back-to-back in series with said test-energy-source, so that the tube which is connected in conducting-polarity with respect to the polarity of the test-energy-source acts as a surge-initiating surge-conducting tube, whereas the other tube acts as a surge-blocking tube prior to the initiation of the surge; impulsing-means for approximately simultaneously energizing the control-circuits of the two tubes for firing said tubes by putting them in a state of conduction-readiness; and control-circuit means, responsive to the firing of the surge-conducting tube, for substantially simultaneously energizing the testing-instrument; said impulsing-means including means for insuring that the surge-blocking tube fires at least as promptly as the surge-conducting tube.

4. The invention as defined in claim 3, characterized by said tubes being ignitrons, and said control-electrodes being ignitors.

5. The invention as defined in claim 3, characterized by said tubes being ignitrons, said control-electrodes being ignitors, and said control-circuit means including an auxiliary anode in the ignitron-tube which is connected to the test-energy-source in a direction such as to be conductive to the initial discharge of the unidirectional surge.

6. The invention as defined in claim 3, characterized by said commutating device having circuits for channeling said test-energy-source alternately exclusively through first one of said test-circuits and then the other.

7. The invention as defined in claim 3, characterized by the surge-channeling circuits of said commutating device having a common grounded portion including an impedance; and a voltage-responsive circuit, responsive to the voltage-drop in said impedance, for energizing a voltage-responsive circuit of said testing-instrument.

8. An electrical testing-apparatus comprising, in combination: a test-energy-source of repetitive unidirectional surges; separate test-circuits for separately connecting the apparatus to each of a pair of electrical elements to be comparatively tested; a testing-instrument; a commutating device for channeling said test-energy-source alternately exclusively through first one of said test-circuits and then the other; a controlled tube having a main anode-cathode circuit and a control-electrode, said tube normally being in a non-conducting state and having its anode-cathode circuit connected in series with said test-energy-source; impulsing-means for energizing the control-circuit of said tube for firing said tube by putting it in a state of conduction-readiness; and control-circuit means, responsive to the firing of said tube, for energizing the testing-instrument.

9. The invention as defined in claim 8, characterized by the surge-channeling circuits of said commutating device having a common grounded portion including an impedance; and a voltage-responsive circuit, responsive to the voltage-drop in said impedance, for energizing a voltage-responsive circuit of said testing-instrument.

10. The invention as defined in claim 8, characterized by said tube being an ignitron, and said control-electrode being an ignitor.

11. The invention as defined in claim 8, characterized by said tube being an ignitron, said control-electrode being an ignitor, and said control-circuit means including an auxiliary anode in the ignitron-tube which is connected to the test-energy-source in a direction such as to be conductive to the initial discharge of the unidirectional surge.

12. An electrical testing-apparatus comprising, in combination: a test-energy-source of repetitive unidirectional surges; separate test-circuits for separately connecting the apparatus to each of a pair of electrical elements to be comparatively tested; a testing-instrument; a commutating device for alternately channeling said test-energy-source, said test-circuits, and said testing-instrument so that a surge or surges are alternately applied to the respective elements in such manner that the testing-instrument alternately responds to a voltage of first one element and then the other element; a controlled tube having a main anode-cathode circuit and a control-electrode, said tube normally being in a non-conducting state and having its anode-cathode circuit connected in series with said test-energy-source; impulsing-means for energizing the control-circuit of said tube for firing said tube by putting it in a state of conduction-readiness; control-circuit means, responsive to the firing of said tube, for energizing the testing-instrument; the surge-channeling circuits of said commutating device having a common grounded portion including an impedance; and a voltage-responsive circuit, responsive to the voltage-drop in said impedance, for energizing a voltage-responsive circuit of said testing-instrument.

13. The invention as defined in claim 12, characterized by said tube being an ignitron, and said control-electrode being an ignitor.

14. The invention as defined in claim 12, characterized by said tube being an ignitron, said control-electrode being an ignitor, and said control-circuit means including an auxiliary anode in the ignitron-tube which is connected to the test-energy-source in a direction such as to be conductive to the initial discharge of the unidirectional surge.

EARL F. HARTER.

REFERENCES CITED

The following references are of record in the file of this patent:

UNITED STATES PATENTS

| Number | Name | Date |
| --- | --- | --- |
| 1,899,594 | Simon | Feb. 28, 1933 |
| 1,902,958 | Jackson | Mar. 28, 1933 |
| 2,321,424 | Rohats | June 8, 1943 |
| 2,396,294 | Spencer | Mar. 12, 1946 |
| 2,424,334 | Schneider et al. | July 22, 1947 |

OTHER REFERENCES

Publication entitled "A New Method of Detecting and Locating Insulation Faults," in Instruments Magazine, October 1945, pages 682–683.